Patented Oct. 26, 1926.

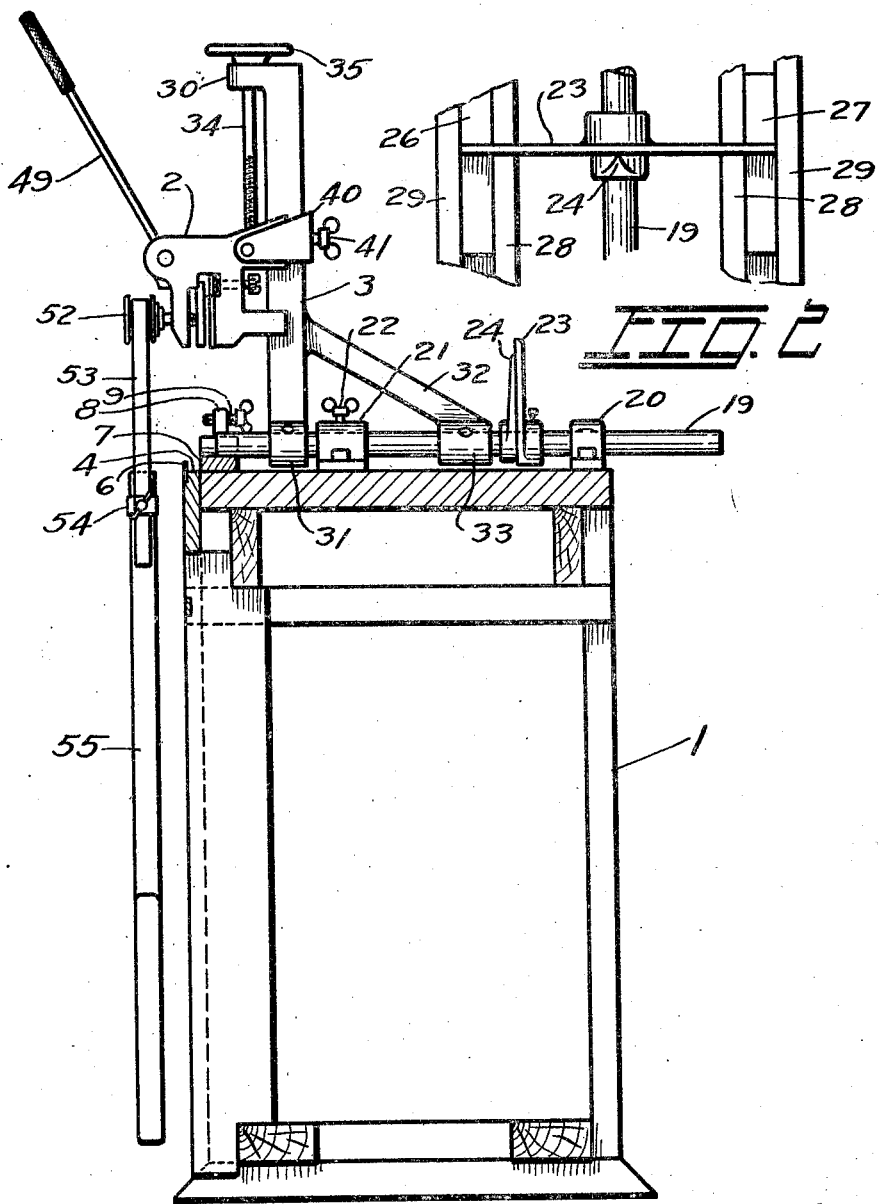

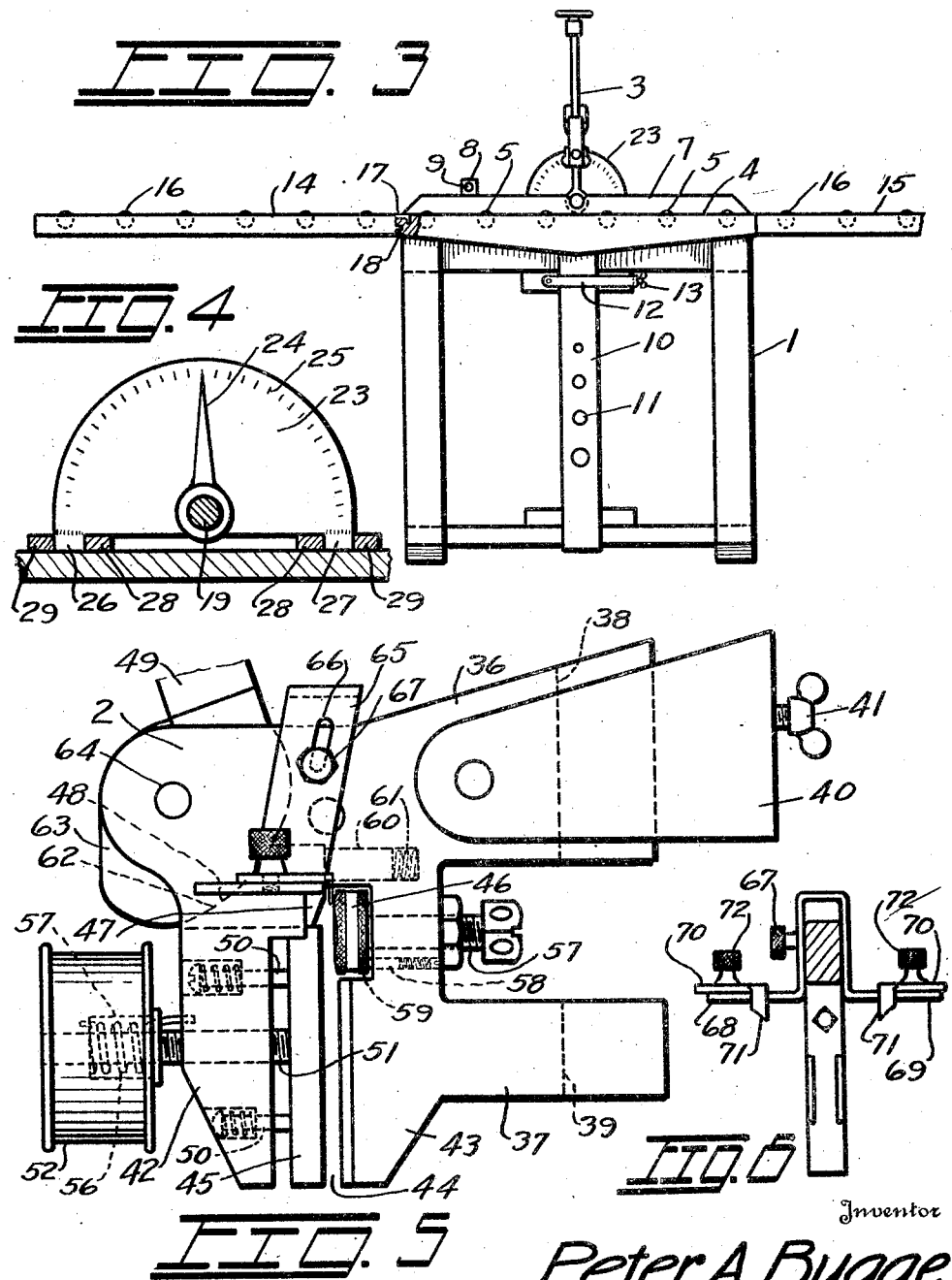

1,604,841

UNITED STATES PATENT OFFICE.

PETER A. BUGGE, OF SEATTLE, WASHINGTON.

SAW SET.

Application filed November 25, 1925. Serial No. 71,294.

The invention is a device for holding and readily setting saws or the like.

The object of the invention is to provide a device in which saws may be readily held and which may be readily adjusted to engage the saw teeth.

Another object of the invention is to provide a device for setting saws in which the saw may be readily moved as the teeth are engaged by the setting device.

A further object of the invention is to provide a device which will set both straight and circular saws.

And a still further object of the invention is to provide a device for holding and setting saws which is provided with a dial to determine the angle of the setting device.

With these ends in view the invention embodies a stand, a shaft in the center of the said stand, a vertical frame on the said shaft, a saw set slidable on the said vertical frame, and a means for readily holding a saw below the said saw set.

Other features and advantages of the invention will appear from the following description taken in connection with the drawings, wherein:—

Figure 1 is a vertical cross section through the device.

Figure 2 is a plan view showing sliding guides for the dial.

Figure 3 is a front view of the device.

Figure 4 is a detail showing the face of the dial.

Figure 5 is another detail showing the setting device.

Figure 6 is a sectional view showing the guards, or indicating points, on the setting device.

In the drawings I have shown my device as it would be made wherein numeral 1 indicates the stand, numeral 2 the saw setting device, and numeral 3 the frame for supporting the saw setting device.

The stand 1 is made with a flat upper surface, having a straight edge 4 along the front edge to hold saws or the like. The straight edge 4 is provided with rollers 5 as shown in Figure 3, and an outer flange 6 as shown in Figure 1. It will be observed that the saw may be placed upon the rollers and readily held by the outer flange. Adjacent the straight edge 4 is a guard 7 against which the inner side of the saw may be held, and upon the guard 7 is a projection 8 having a set screw 9 in it, which may be screwed outward against the saw to regulate the position of the saw. In the center of the front of the stand 1 is a vertical member 10, having openings 11 therein, in which circular saws may readily be held by bolts or the like. This member 10 is held in place by a strap 12, having a thumb screw 13 at one end, so that it may readily be removed and replaced. The straight edge 4 may be extended as shown in Figure 3 by providing extensions 14 and 15 with rollers 16 in them, and the inner ends of the extensions may be provided with hooks 17 and pins 18 by which they may be readily held to the ends of the straight edge 4. It is understood that the stand may be made of any suitable material and in any suitable design.

The saw set 2 is slidably held upon a frame 3 and the frame 3 is mounted upon a shaft 19 as shown in Figure 1. The shaft 19 is mounted in bearings 20 and 21 and it will be observed that the bearing 21 is provided with a set screw 22 by which the shaft 19 may be readily held at any angle. On the rear part of the shaft is a dial 23 and a pointer 24, as shown in Figures 1 and 4. The dial 23 is provided with graduation marks 25, and the outer edges are provided with sliding members 26 and 27 which are slidable between the bars 28 and 29, as shown in Figures 2 and 4. It will be observed that as the stand 3 is moved backward and forward so that the saw set will engage the saw, the shaft 19 will also slide backward and forward in the bearings 20 and 21.

The stand 3 is made with a vertical member having a hub 30 at the upper end and another hub 31 at the lower end, and the stand is provided with a brace 32, having a hub 33 at its lower end, which is mounted upon the shaft 19. In the hub 30 is a vertical screw 34, having a hand wheel 35 at the upper end by which it may be rotated, and this screw is threaded into the upper edge of the saw set 2 so that as it is rotated it will move the set upward or downward.

The saw set 2 is made as shown in Figure 5, which is substantially the same as disclosed in my prior Patent Number 1,482,780, which was issued February 5th, 1924. The saw set as shown in Figure 5 is provided with outwardly extending members 36 and 37, having slots 38 and 39 in them, which are slidable over the vertical member of the frame 3. The member 36 is provided with a clamp 40, having a set screw 41 in it, by which the device may be readily clamped to the frame 3. The device is provided with jaws 42 and 43 with an opening 44 between them into which a saw may be placed, a member 45 for clamping the saw, an anvil 46 against which the saw teeth are set, a member 47 for engaging the saw teeth and a cam shaped member 48 which is operated by a handle 49 for engaging the saw teeth and forcing them against the anvil 46. The member 45 is resiliently held on spring pins 50, and is forced outward by a quick thread screw 51, having a pulley 52 on the outer end. A strap is passed over the pulley 52, as indicated by the numeral 53, in Figure 1, and the lower end of the strap is held by a clamp 54 to a member 55 which extends downward so that it may be engaged by the foot of the operator to be drawn downward. It will be observed that as the member 55 is drawn downward, the pulley 52 will rotate in a clockwise direction and screw the screw 51 inward to force the plate 45 against the saw, and as soon as the member 55 is released the pulley will return to the normal position through the action of a spring 56 in a recess 57 in the pulley.

The anvil 46 is held on a screw 57 and below the screw 57 is a spring pin 58 which engages notches 59 in the anvil 46 to permit it to move and at the same time hold it in different positions. It will be observed that the face of the anvil may be provided with a plurality of beveled surfaces at different angles and the anvil may readily be set so that either of these beveled surfaces will be engaged by the saw teeth as they are forced against it. It will therefore be possible to set the teeth of a saw at any desired angle and set all the teeth of a saw at exactly the same angle.

The member 47 is slidably held in the device and the forward side is provided with a pin 60 that is slidable in a slot in which is a spring 61 to return the member to the normal position. The opposite side of the member 47 is provided with a curved surface 62 to engage the cam shaped surface 48 of the member 63 that is pivotally held in the device by a pin 64.

The device is provided with a guard 65 that is held through a slotted hole 66 by a set screw 67, and the lower ends of the guard, as indicated by the numerals 68 and 69, are bent outward as shown in Figure 6, and arranged so that they may be engaged by the points of the saw teeth. On the members 68 and 69 are slidable members 70, having points 71 extending downward below the members 68 and 69, and the members 70 are adjustably held by set screws 72 as shown. It will be observed that when setting a saw the points 71 are adjusted to the distances between the teeth so that a tooth may be located in the exact position in the saw set without looking inside of the set.

It will be understood that changes may be made in the construction without departing from the spirit of the invention. One of which changes may be in the design or arrangement of the means for operating the screw 51, as it is understood that any suitable means may be used for turning this screw; another may be in the use of other means for holding the saw; another may be in the removing of the saw setting device from the stand, and holding and operating it by hand; another may be in the use of other means for holding circular saws; and still another may be in the use of other means for determining the angle to which the setting device may be set.

The construction will be readily understood from the foregoing description. The device is particularly adaptable for setting circular, frame and gang saws of any angle, or with a straight tooth line. It may also be used for setting bucking and falling saws by removing the saw setting device from the frame and operating it by hand. It will be observed that the screw 51 may readily be turned by hand. A straight saw may be placed upon the rollers 16 and the setting device 2 held directly above the saw, as shown in Figures 1 and 3, and adjusted so that the saw will pass through the space 44. When the saw tooth is exactly in front of the anvil, the angle of which may have been adjusted, the handle 49 may be pulled downward, and the member 47 will force the saw tooth over until it is bent to the proper position. By engaging and rigidly holding the teeth in this manner it will be possible to set the saw without danger of breaking the teeth, as the teeth will be rigidly gripped and bent to their proper positions by a smooth steady motion. It will also be observed that the setting device 2 may readily be twisted to any suitable angle, so that saws having teeth of different angles may readily be set in the same manner.

Having thus fully described the invention what I claim as new and desire to secure by Letters Patent, is:—

1. In a device for holding and setting saws, a stand, a frame supported on the said stand, a saw set slidable on the said frame, means for adjusting the position of the said saw set in relation to the said frame, means for readily adjusting the angle of the said saw set and frame, means for readily holding a saw below the said saw set, and means for operating the said saw set to engage and set the saw teeth.

2. In a device of the class described, a saw set, means operable by a foot lever for engaging and holding a saw in the said set, a frame for adjustably supporting the said saw set, means for adjusting the position of the said frame, and means for readily supporting a saw in the said frame.

3. In a device of the class described, a saw set, a frame for supporting the said saw set, a screw in the said frame for raising or lowering the said saw set, a slidable shaft upon which the said frame is supported, and a stand upon which the said shaft is mounted.

4. In a device of the class described, a stand, a slidable shaft mounted in bearings upon the said stand, a frame mounted upon the said slidable shaft, a saw set slidable on the said frame, means in the said frame for raising or lowering the said saw set, means on the front edge of the stand for holding a saw below the said set, a clamping device in the said set, means for operating the said clamping device by foot, means for engaging and setting the said saw teeth in the said set, and means for operating the said tooth engaging means by hand.

5. In a device of the class described, a stand, a ledge having rollers therein along the upper outer edge of the said stand, extension members, also having rollers therein, that may readily be attached to the ends of the said ledge, a vertical member in the center of the said stand having openings therein to which circular saws may be readily attached, a transverse shaft slidable in bearings on the said stand, a vertical frame extending upward from the said shaft, a dial for indicating the angle of the said frame, a saw set slidable on the said frame, means for raising or lowering the said saw set, means for operating a gripping member in the said saw set from a remote point, adjustable tooth engaging means in the said set, and a cam shaped member having an outwardly extending handle for operating the said tooth engaging means.

In testimony whereof I hereby affix my signature.

PETER A. BUGGE.